(12) United States Patent
Pfau

(10) Patent No.: US 7,278,194 B2
(45) Date of Patent: Oct. 9, 2007

(54) METHOD AND APPARATUS FOR FIXING TOOLS IN CLAMPING CHUCKS

(75) Inventor: Christian Pfau, Bietigheim-Bissingen (DE)

(73) Assignees: E. Zoller GmbH & Co. KG, Freiberg (DE); Einstell- und Messgeraete, Neckar (DE)

( * ) Notice: Subject to any disclaimer, the term of this patent is extended or adjusted under 35 U.S.C. 154(b) by 336 days.

(21) Appl. No.: 10/727,205

(22) Filed: Dec. 3, 2003

(65) Prior Publication Data

US 2004/0111855 A1 Jun. 17, 2004

Related U.S. Application Data

(63) Continuation of application No. PCT/EP02/06819, filed on Jun. 20, 2002.

(30) Foreign Application Priority Data

Jun. 26, 2001 (DE) ................ 101 31 352

(51) Int. Cl.
*B23P 11/00* (2006.01)
*B23P 21/00* (2006.01)
*B23Q 17/00* (2006.01)

(52) U.S. Cl. ............... 29/407.01; 29/407.05; 29/407.09; 29/407.1; 29/447; 29/700; 29/703; 29/720; 29/721; 29/281.1

(58) Field of Classification Search ........... 29/407.01, 29/407.04, 407.05, 407.09, 407.1, 447, 700, 29/703, 711, 712, 718, 720, 721, 281.1, 33 R, 29/800; 403/273; 33/639; 409/218

See application file for complete search history.

(56) References Cited

U.S. PATENT DOCUMENTS

| 3,241,451 A | 3/1966 | Williamson |
| 3,701,199 A * | 10/1972 | Lewis ................ 356/138 |
| 5,035,556 A | 7/1991 | Lamotte et al. |
| 5,280,671 A * | 1/1994 | Marquart ............ 29/447 |
| 5,582,494 A | 12/1996 | Cook |
| 5,992,860 A | 11/1999 | Marquart |
| 6,216,335 B1 * | 4/2001 | Freyermuth ........... 29/701 |
| 6,588,083 B2 | 7/2003 | Voss et al. |
| 6,629,480 B1 | 10/2003 | Freyermuth et al. |

FOREIGN PATENT DOCUMENTS

| EP | 0 247 939 A1 | 12/1987 |
| EP | 0 538 642 A2 | 4/1993 |
| EP | 0 538 642 B1 | 4/1993 |
| EP | 0 830 917 A1 | 3/1998 |
| EP | 1 002 605 A1 | 5/2000 |

(Continued)

OTHER PUBLICATIONS

Zoller- "Einstell- und Messgeraete"- Homepage of E. Zoller GmbH & Co. KG, dated May 15, 2001.

*Primary Examiner*—Jermie E. Cozart
(74) *Attorney, Agent, or Firm*—Laurence A. Greenberg; Werner H. Stemer; Ralph E. Locher

(57) ABSTRACT

A tool, in particular a shaft tool, is inserted into and fixed in a clamping chuck. The actual position of the tool, particularly in the direction of the longitudinal axis of the tool or in the direction of insertion, is determined before and/or during the insertion of the tool into the clamping chuck. Based on the determined actual position, the tool is inserted into the clamping chuck until a setpoint position has been reached.

30 Claims, 3 Drawing Sheets

FOREIGN PATENT DOCUMENTS

| | | |
|---|---|---|
| EP | 1 002 605 B1 | 5/2000 |
| EP | 1 103 338 A1 | 5/2001 |
| EP | 1 103 338 B1 | 5/2001 |
| EP | 1 155 765 A1 | 11/2001 |
| GB | 2 198 374 A | 6/1988 |
| JP | 01321151 | 12/1989 |
| WO | 99/07505 | 2/1999 |
| WO | 02/18093 A1 | 3/2002 |

* cited by examiner

METHOD AND APPARATUS FOR FIXING TOOLS IN CLAMPING CHUCKS

CROSS-REFERENCE TO RELATED APPLICATION

This application is a continuation of copending International Application No. PCT/EP02/06819, filed Jun. 20, 2002, which designated the United States and which was not published in English.

BACKGROUND OF THE INVENTION

Field of the Invention

The present invention lies in the mechanical arts and relates, in particular, to a method and an apparatus for fixing tools in clamping chucks. More specifically, the invention deals with a method of fixing a tool, in particular a shank-type tool, in a clamping chuck, in which the tool is inserted into the clamping chuck and fixed in the clamping chuck, and a corresponding apparatus with means for inserting the tool into the clamping chuck.

Methods for the frictional, i.e., force-locking clamping of shank-type tools, in particular cutting tools, in corresponding chucks for mounting in CNC machine tools are known in the art. In one of those prior art methods, for example, a cylindrical mounting bore on the tool receptacle of the chuck is heated with hot air or via induction currents, so that the mounting bore expands. The enlargement of the mounting bore by the heating then permits the insertion of the actual cutting tool, so that a frictional bond between the shank and the tool receptacle is provided immediately after the tool receptacle has cooled down. The simple design of the tool receptacles, the high accuracy of concentric running, the low unbalance and the high transmission of force prove to be very advantageous. This is so in particular, for the purposes of high-speed machining, which is gaining increasing importance nowadays in production by stock removal or shaving.

Also known are hydraulic expansion chucks, which can be pressurized by way of an internal hydraulic cylinder in such a way that their inner bearing surface in a tool receptacle presses against an inserted tool shank.

Various shrink-fitting appliances are known for carrying out such methods. All the known shrink-fitting appliances require manual manipulation. In such apparatuses, the tools are merely shrunk in place or unshrunk; the actual measuring for determining tool dimensions, e.g. as correction value for a CNC machine, or the setting to a certain desired size is then subsequently effected in a separate operation on conventional setting and measuring appliances.

In particular in the case of multi-spindle machines, however, it is required, for example, that a plurality of tools of the same type can be set to the same tool length. In such a case, the respective cutting tools must be put into a certain linear position with regard to the shrink-fit chuck in the heated, open state of the latter. As a rule, this requires a very rapid procedure, since the time for setting the tool during a shrink-fitting operation is typically only about 2 to 10 seconds. To set desired tool dimensions, it is known in this context to use adapter pieces or length stops, as a result of which, however, setting accuracies can be achieved merely within the range of a tenth of a millimeter.

Furthermore, such methods hold the risk of injuries or burns for the operator on account of the manual manipulation. The implementation of the method is laborious and depends to a high degree on the skill of the respective operator.

In recent years, solutions have been presented in which the actual position of the tool shank, with set desired length, has been determined on a setting and measuring assembly via a positionable stop. In that case, a stop activated in parallel in the shrink-fitting appliance is pre-positioned to the desired position in such a way that the tool rests on the preset stop during the shrink fitting. This procedure requires two different apparatuses, both of which require the presence of and control by an operator. The accuracy which can be achieved with the tactile stop also proves to be unsatisfactory for many applications. On account of the manual insertion or pressing-in of the tool during the shrink-fitting operation, there once again exists the risk of burns for the operator. Cuts caused by the requisite contact with the tool cutting edges also cannot be ruled out.

SUMMARY OF THE INVENTION

It is accordingly an object of the invention to provide a method and a device which overcome the above-mentioned disadvantages of the heretofore-known devices and methods of this general type and which allow to fix tools in a clamping chuck as simply as possible and in the shortest possible time.

With the foregoing and other objects in view there is provided, in accordance with the invention, a method of fixing a tool, such as a shank-type tool, in a clamping chuck. The method comprises the following steps:

inserting the tool into the clamping chuck along an insertion direction;

determining an actual position of the tool along the insertion direction before and/or during the insertion;

continuing the step of inserting the tool into the clamping chuck on a basis of the actual position, until a desired position is reached; and fixing the tool in the desired position in the clamping chuck.

In other words, the invention allows fixing a tool in a clamping chuck quickly and exactly and, in particular, advantageously without requiring a stop.

By way of the automation that can be achieved with the invention, the risk for an operator, compared with conventional methods, is largely ruled out, to be precise in particular during shrink-fitting methods, although the solution according to the invention can be applied in the case of all the methods and apparatuses which appear to be appropriate to the person skilled in the art, such as, for example, in the case of methods and apparatuses with clamping screws, hydraulic clamping mechanisms, etc.

The method according to the invention can be carried out fully automatically and therefore independently of the operator. According to the invention, cutting tools can be shrunk in place without the risk of injury in the shortest time and with the greatest accuracy. The exchange, fixing, in particular shrink fitting, measuring, setting, replacement and/or cooling of tools may be effected within a closed sequence without an operator having to intervene.

Owing to the fact that, according to the invention, a conventional, fully automatic setting and measuring configuration with image processing can be used, the financial outlay for carrying out the method according to the invention is extremely small compared to its usefulness.

On account of the possibility of automating the shrink-fitting operation and setting and measuring operation throughout, all the data relevant to the shrink fitting, such as, for example, induction time, correction of measure value, cooling time, etc., can also be stored in a database of the setting and measuring appliance for a respective tool type or a respective tool identification number and can be automatically taken into account by the system.

With the solution according to the invention, all the measuring methods which appear to be appropriate to the person skilled in the art can be carried out before and/or during the insertion of the tool; for example a cutting tool number can be determined, individual tool cutting edges can be measured, a largest tool cutting edge can be determined and/or an envelope curve of the tool can be determined, etc.

According to the invention, a reduction in the shrink-fitting and unshrinking times can be achieved compared with conventional methods, so that an optimum time and energy ratio can be realized. When the method according to the invention is being carried out, less heat is produced compared with conventional methods, as a result of which the system and the tool holder overall are protected.

The desired position of the tool cutting edge is expediently defined with regard to a reference point on the clamping chuck. This reference point can be determined for each shrink-fitting operation by means of an optical system used. In numerous applications, however, it may be assumed that the reference point is always arranged in an accurate position during insertion of the clamping chuck into a tool-mounting spindle, so that no actual measurement of this point is required.

It is preferred that the actual position and/or the desired position and/or the reference position, i.e., the reference point, is determined and/or checked in a non-contact manner, in particular by means of a measuring configuration having an optical system. With this measure, accurate measurements can be carried out in a simple and effective manner. Damage caused by contact between the tool and a measuring configuration can be reliably avoided.

According to a preferred embodiment of the method according to the invention, the clamping chuck is rotated about a rotation axis during the insertion of the tool into the clamping chuck. This measure allows the tool to be inserted into the clamping chuck in an accurate position and in an essentially self-centering manner.

Furthermore, it is possible according to the invention, following the shrink fitting of the tool, to unshrink the tool from the clamping chuck.

A setting and measuring configuration which is rotationally fixed with regard to the rotation of the clamping chuck and the tool is expediently provided for carrying out the measuring of the tool. With this measure, complete measuring of the tool before and/or in particular during the fixing or the shrink fitting is possible in a simple manner. Here, fixing or shrink-fitting or measuring operations can be carried out simultaneously in an especially simple manner.

Other features which are considered as characteristic for the invention are set forth in the appended claims.

Although the invention is illustrated and described herein as embodied in a method and an apparatus for mounting a tool in a chuck, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
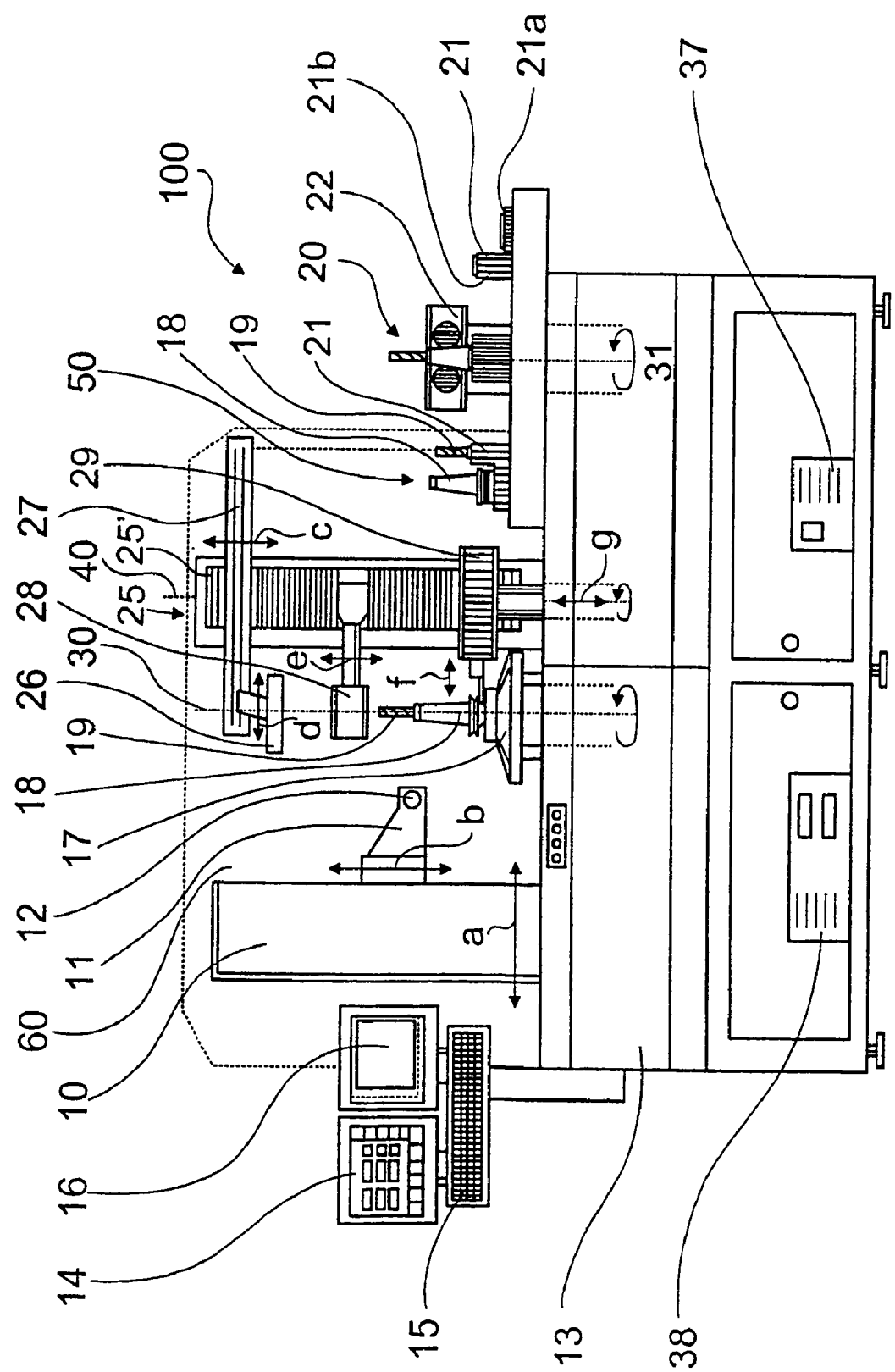
FIG. 1 is a schematic, partly sectional side view showing the construction of a preferred embodiment of the apparatus according to the invention.

Referring now to the figures of the drawing in detail and first, particularly, to FIG. 1 thereof, there is shown a preferred embodiment of the apparatus according to the invention. The apparatus is identified with the reference numeral 100.

A setting and measuring configuration has a slide 10 which is traversable in the direction of a double arrow a. The slide moves with it an optical-system carrier 11 that is traversable in the direction of a double arrow b. The optical-system carrier 11 carries a camera or an optical measuring system 12, which preferably works by the transmitted-light method.

The slide 10 is traversable on a base body 13, which carries further elements of the apparatus according to the invention, as will be explained further below.

The measuring unit having the components 10, 11 and 12 is operated by way of an operating unit 14. The operating unit 14 preferably has a computer 38 designed as a PC and having means for photogram image processing. Control commands or settings can preferably be input by way of a keyboard 15. A tool to be measured can be displayed on a monitor or display panel 16.

A CNC-controlled tool-mounting spindle that is rotatably mounted about a rotation axis 30 is designated by 17. The tool-mounting spindle serves to mount a shrink-fit chuck 18, into which a tool 19 to be shrunk in place can be inserted.

On the right in the figure there is shown a loading and unloading magazine, designated overall by 20, which is designed as a turret and so as to be rotatable about a rotational axis 31. The magazine 20 has a number of loading and unloading stations 21 which are each configured to receive a shrink-fit chuck 18 in a region 21a and a shank-type tool, to be shrunk in place, in a region 21b. Furthermore, the loading and unloading station is formed with a cooling unit 22, into which the complete tool formed from the shrink-fit chuck and the shank-type tool can be inserted after the shrink fitting.

Furthermore, the apparatus has a CNC-controlled and/or pneumatically driven unit 25 with a vertical slide 25'. This vertical slide 25' carries a tool-clamping device 26 on a cross slide 27 and an induction coil 28. The cross slide 27 is displaceable in the direction of double arrow c, and the tool-clamping device 26 attached thereto is displaceable in the direction of double arrow d. Furthermore, the tool-clamping device 26 is designed to be rotatable in the axis 30.

The induction unit or coil 28 is displaceable in the direction of double arrow e along the axis 30. It is conceivable to additionally design the induction unit 28 in the direction of double arrow f and/or to be rotatable about the axis 40.

Furthermore, the unit 25 has a tool changer 29 for transferring shrink-fit chucks from the magazine 20 to the tool-mounting spindle 17 and vice versa. The tool changer is rotatable about the axis 40 and traversable in the direction of double arrow g parallel to the axis 40.

The cooling unit 22 and the induction coil 28 can be activated by way of a generator 37 which is accommodated in the base body. Accommodated in the base body is the computer 38, which, in addition to the abovementioned image processing, serves for the CNC motor control, for example for the above-mentioned components 20, 25, 27, 29, 17, 28, 26.

The apparatus may be designed with a complete enclosure 60 shown by a broken line.

The way in which a preferred embodiment of the method according to the invention is carried out will now be described in more detail with reference to the apparatus according to FIG. 1 explained above.

First of all a shank-type tool 19 is placed in a mounting sleeve 21', after which these two parts are inserted into a corresponding receptacle 21b of a loading and unloading station 21. The positioning of the mounting sleeve 21' in the station 21 can be seen especially clearly in FIG. 5.

Accordingly, a shrink-fit chuck 18 is inserted into a corresponding receptacle 21a of the station 21. The receptacle 21a can likewise be seen in FIG. 5.

The identification number of the tool 19 is then input into the computer 38 by means of the keyboard 15. As an alternative to this, the relevant data of the tool which can be assigned by means of the identification number, for example desired sizes, shrink-fitting time, shank diameter, etc., can be input into the system manually by the operator or loaded from the database.

When the shrink-fitting sequence is started by means of corresponding control of the computer 38, the magazine 20 is rotated automatically about its center axis 40, so that the shrink-fit chuck 18 and the shank-type tool 19 pass into a removal position (designated by 50) of the magazine 20. The tool gripper or changer 29 then moves out and removes the shrink-fit chuck 18 from the loading and unloading station 21 located in the removal position and inserts it into the tool-mounting spindle 17 by means of a rotation about the axis 40. A tool-clamping device integrated in the tool-mounting spindle 17 is automatically switched on and fixes the shrink-fit chuck 18 in the tool-mounting spindle 17 in a power-operated manner.

The induction unit 28, controlled via the computer 38, then travels over the shrink-fit chuck 18 positioned in the tool-mounting spindle 17, i.e. to an induction height assigned to the shrink-fit chuck 18. In the process, as already mentioned, the induction unit 28 is traversable in the direction of double arrow e.

The gripper unit 26 then travels along the cross slide 27 and, by means of a corresponding displacement of the slide 27 in the direction of double arrow c, to the shank-type tool 19, which, as mentioned, is likewise positioned in the loading and unloading station 21 located in the removal position 50. The gripper unit 26 then grips the shank-type tool 19 and removes it from the mounting sleeve 21'.

The shank-type tool 19 is moved by means of the gripper unit 26 in a CNC-controlled manner into a waiting position above the clamped shrink-fit chuck 18. Thus both shrink-fit chuck 18 and shank-type tool 19 are positioned concentrically with regard to the axis 30.

The measuring slide 10 and the optical-system carrier 11 then travel in such a way that the optical system 12 passes into the region of the cutting edge 19a of the shank-type tool 19 to be measured. In the event of the desired dimensions of the cutting edge 19a not being known, provision is expediently made for an automatic search run to be carried out by means of the measuring appliance (optical system 12 and associated computer 38).

As soon as the tool cutting edge of the shank-type tool 19 is in the field of vision of the optical system 12, the gripper and rotary unit 26 (CNC-controlled by the computer 38) starts to rotate the shank-type tool 19 about the rotation axis 30 in a motor-operated manner, to be precise in order to focus the tool cutting edge. Once the tool cutting edge has been focused, the actual position of the tool cutting edge along the longitudinal axis, i.e. in particular the actual position of the cutting tip of the shank-type tool, is determined with micro-accuracy. With the longitudinal dimensions of the shank-type tool which are thus provided, or with the actual positioning of the cutting tip, the traverse path along the axis 30 for the change unit 26 for achieving the essential desired dimension for the shank-type tool, in particular with regard to the shrink-fit chuck 18 or the tool-mounting spindle 17, is known.

The induction coil 28 is now switched on in a computer-controlled manner, as a result of which the shrink-fit chuck 18 is heated and expands.

After this, the tool-mounting spindle 17, driven in a motor-operated manner, starts to rotate about the axis 30. At the same time, the gripper and rotary unit or change unit 26 with the shank-type tool 19 retained therein and the cross slide 27 are traversed in a CNC-controlled manner in such a way that the shank 19b of the shank-type tool 19 is inserted into the shrink-fit chuck 18. During this traveling into position, the cutting edge 19a of the shank-type tool 19 is constantly tracked and measured by means of the optical system 12 (if need be by appropriate displacements of the measuring slides 10 or 11). If changes in the positioning (for example on account of an unintentional displacement of the tool inside the change unit) are detected, these changes are automatically transmitted to the slides 25 or 27 or the computer 38 for the correction calculation.

If the desired size (designated by $L_G$ in FIG. 4) has been achieved on the basis of the longitudinal measurement of the shank-type tool 19, the change or gripper unit 26 which holds the shank-type tool 19 is stopped in its current position. Furthermore, the power fed to the induction coil 28 is switched off, as a result of which the shrink-fit chuck cools down with the shank-type tool 19 being secured in its current position.

After appropriate cooling of the shrink-fit chuck 18 or heating of the shank 19b, for example after a few seconds, the gripper unit 26 releases the tool 19. The unit is then traversed upward along the axis 30 of the cross slide 27 by means of a perpendicular movement, for example into a waiting position. After this, the induction unit 28 is likewise traversed upward along the axis 30 into a waiting position.

The rotation of the tool-mounting spindle 17 about the axis 30 is now ended, and the tool clamping with which the shrink-fit chuck 18 is fixed in the tool spindle is released.

The tool changer 29 now removes the complete tool, shrunk in place and consisting of shrink-fit chuck 18 and shank-type tool 19, and puts it into an available loading and unloading station of the magazine 20. By rotation or another suitable movement, the shrunk complete tool is then positioned in front of or in the cooling station 22. After sufficient cooling and signaling or checking, for example by an infrared inductor (not shown), the tool is approved on the basis of a visual inspection for removal by an operator. This ensures that an operator removing the complete tool is not exposed to the risk of burns.

The sequence shown can be repeated in an analogous manner for all the loading and unloading stations 21 which are provided on the magazine 20 and are fitted with corresponding shrink-fit chucks 18 and shank-type tools 19.

With the apparatus described, an unshrinking operation can also be carried out in a simple manner by executing the steps described above in reverse sequence. During an unshrinking operation, the method steps in connection with the measuring of the tool are expediently dispensed with.

It is essential for the shrink fitting in the method described that the exact positioning of the tip of the shank-type tool 19 in the direction of its longitudinal axis, i.e. on the axis 30, is already established before the shank-type tool 19 is inserted into the shrink-fit chuck 18. With this information, it is possible to move the shank-type tool 19 down into the desired position inside the shrink-fit chuck 18 in a simple manner without additional setting and adjusting mechanisms and in particular stops having to be provided in the shrink-fit chuck 18. According to the invention, the shank-type tool 19 to be shrunk in place is merely inserted to the correct height inside the heated shrink-fit chuck 18, whereupon the shrink-fit chuck 18 is cooled for fixing the shank-type tool 19 in this position. In conventional methods, it was necessary to lower the shank-type tool 19 down to a stop inside the shrink-fit chuck 18 and then set the desired position of the shank-type tool 19 by means of mechanical displacement of this stop. To this end, it was necessary to keep the shrink-fit chuck 18 heated for a substantially longer period than in the case of the present method.

Essential components of the apparatus described with reference to FIG. 1 are shown in greater detail in FIGS. 2 to 4.

Figures 2, 3:
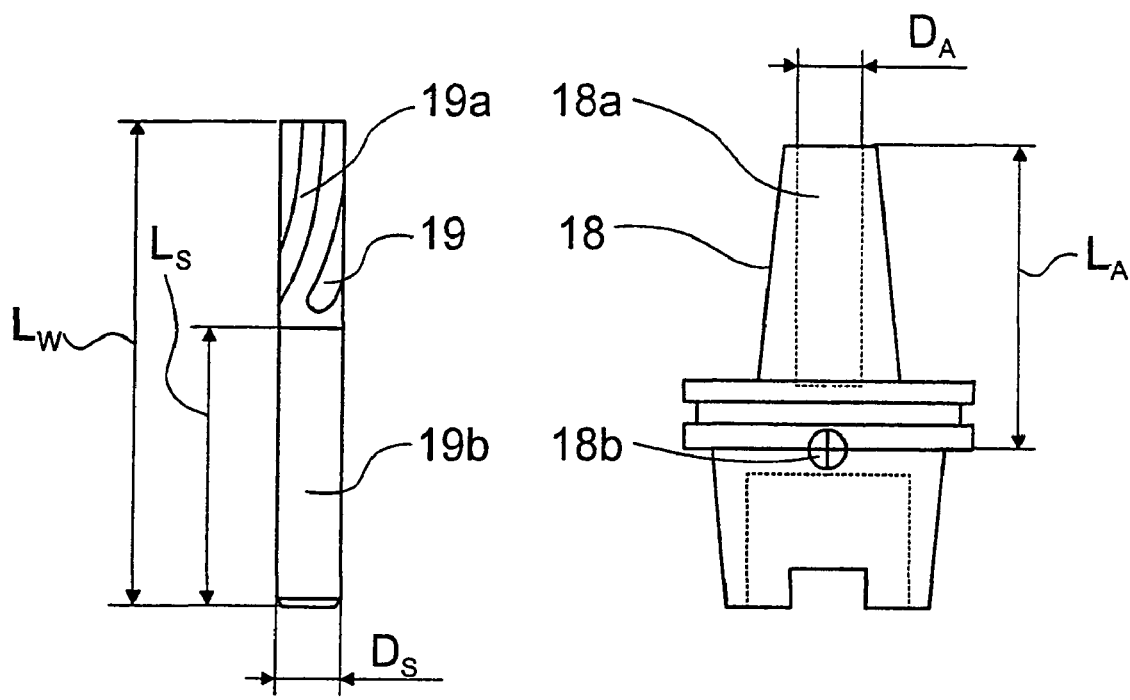
FIG. 2 is an elevational side view of a shank-type tool to be shrunk in place according to the invention.
FIG. 3 is an elevational side view of a shrink-fit chuck which can be used according to the invention.

A shank-type tool 19 can be seen in FIG. 2. The shank-type tool 19, which is to be inserted into a shrink-fit chuck 18 as shown in FIG. 3 has a total length $L_W$ and a shank length $L_S$.

The maximum diameter (envelope curve) of the shank-type tool 19 is designated by $D_S$.

The shrink-fit chuck 18 shown in FIG. 3 has an insertion bore 18a having a diameter $D_A$. In accordance with the design of the machine tool used, the insertion bore 18a is formed with a steep-taper or a hollow-taper shank. The vertical length of the shrink-fit chuck 18 from a reference position or reference point 18b is designated by $L_A$. The desired position of the shank-type tool 19 inserted into the shrink-fit chuck 18 is expediently set relative to this reference point 18b. For this purpose, it may be appropriate to also detect the position of the reference point 18b by means of the optical system 12.

Figure 4:
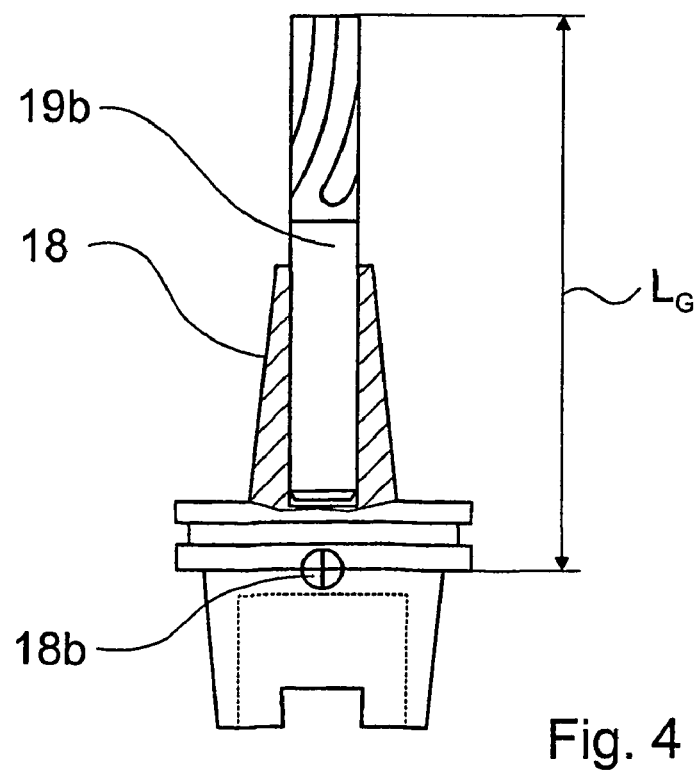
FIG. 4 is a partly sectional side view of a complete tool formed from a shrink-fit chuck and a shank-type tool shrunk in place in the chuck.

These facts are shown in FIG. 4, in which a shrunk complete tool formed from the shrink-fit chuck 18 and the shank-type tool 19 is shown. It can be seen that the desired length $L_G$ of this complete tool is defined relative to the point 18b. The point 18b expediently corresponds to the plane-parallel position of the shrink-fit chuck 18 in the tool-mounting spindle 17. Thus it is likewise possible, for example, to assume that the precise position of the point 18b is known, so that optical detection by means of the optical system 12 is not necessary.

Figure 5:
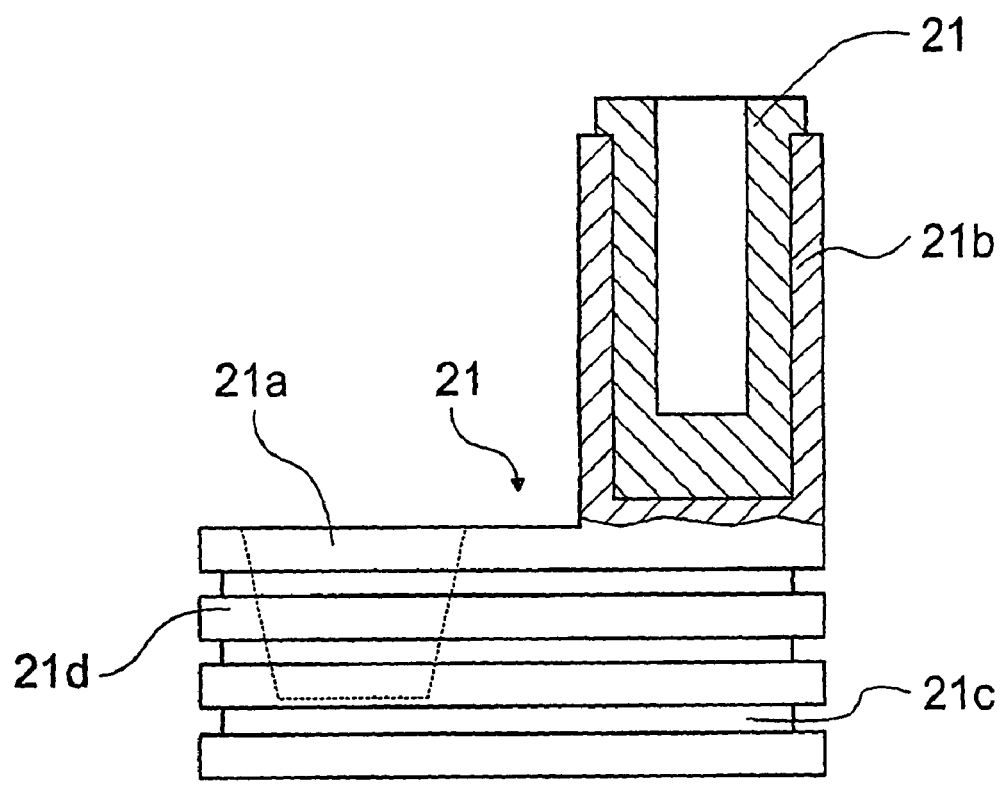
FIG. 5 is a partly sectional side view illustrating a loading and unloading station which can be used in connection with the apparatus according to the invention.

Shown in FIG. 5, as already mentioned, is a loading and unloading station 21 as is provided in the magazine 20. It is possible, for example, to fit the magazine 20 with 8 or 16 stations of this kind. The loading and unloading station 21 has a metal body 21c for receiving an individual shrink-fit chuck 18 in a receptacle 21a. This metal body 21c is expediently formed with cooling ribs 21d for heat dissipation. On its top side, the metal body 21c is formed with a receptacle 21b, into which an insertion sleeve 21' for the pre-positioning of individual shank-type tools 19 for removal by the gripper and rotary unit 26 (see FIG. 1) can be inserted.

Figure 6:
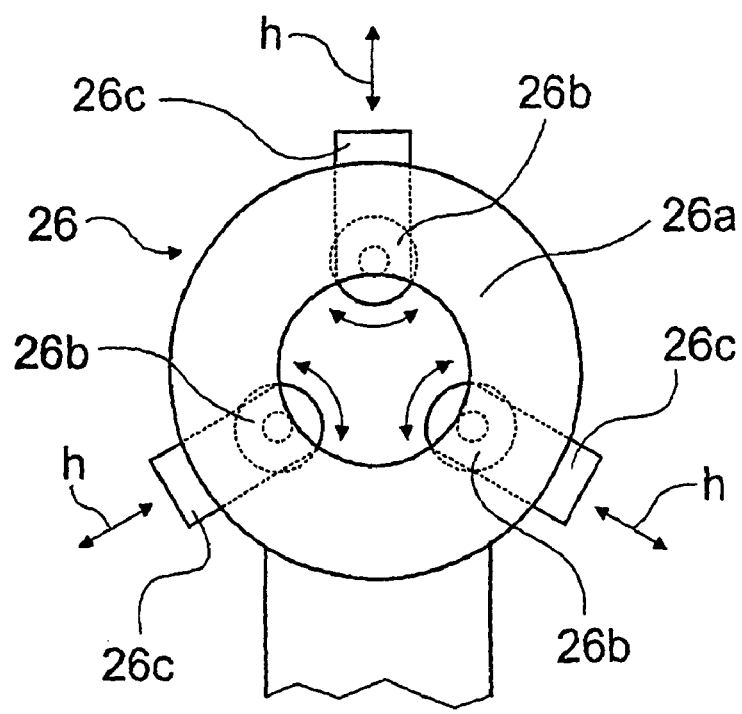
FIG. 6 is a plan view of a gripper and rotary unit which can be used with the apparatus according to the invention and which is intended for a shank-type tool to be shrunk in place.

Finally, a gripper and rotary unit 26 for the shank-type tool 19 is shown in FIG. 6. The unit 26 has a housing 26a, drive rollers or rollers 26b for holding and rotating the shank-type tool 19, and clamping slides 26c for receiving different shank diameters.

By the rollers 26b being appropriately displaced inward in the direction of arrows h, tools having any desired shank diameters can be fixed in a reliable manner. Only one of the rollers 26b is expediently designed as a drive roller in order to permit a rotation of the clamped shank-type tool 19 during the insertion into the shrink-fit chuck 18 with continuous measurement.

I claim:

1. An apparatus for fixing at least one tool in a clamping chuck, the apparatus comprising:
    a device for inserting the tool into the clamping chuck;
    a configuration for determining an actual position of the tool before and/or during an insertion of the tool into the clamping chuck;
    a positioning device having a tool-clamping device for positioning the tool in the clamping chuck utilizing information obtained with regard to the actual position of the tool for setting a desired position of the tool inside the clamping chuck; and
    a computer configured for controlling said tool-clamping device during operation from the actual position to the desired position.

2. The apparatus according to claim 1, which further comprises a heater for heating the clamping chuck for receiving the tool.

3. The apparatus according to claim 1, which further comprises a position monitoring system for non-contact determination or checking of at least one of the actual position, the desired position, and a reference position on the clamping chuck, wherein the desired position of the tool is defined relative to the reference position.

4. The apparatus according to claim 1, which comprises a device for rotating at least one of the clamping chuck and the tool about a common rotational axis.

5. The apparatus according to claim 1, wherein said computer computes a transverse path of said tool-clamping device from the determined actual position to the desired position during operation.

6. The apparatus according to claim 1, wherein said computer is configured to guide said tool-clamping device to the desired position without a mechanical stop.

7. The apparatus according to claim 1, wherein said computer is configured for photogram image processing.

8. The apparatus according to claim 1, wherein said computer is configured to complete a correction calculation.

9. The apparatus according to claim 1, wherein said positioning device includes a cross slide, said tool-clamping device is fastened to said cross slide.

10. The apparatus according to claim 1, wherein said tool-clamping device includes a rotary unit.

11. The apparatus according to claim 10, wherein said rotary unit includes drive rollers and a housing, said drive rollers are disposed in said housing.

12. The apparatus according to claim 10, wherein said rotary unit includes clamping slides and a housing, said clamping slides are disposed in said housing.

13. The apparatus according to claim 1, further comprising a loading and unloading magazine having a plurality of loading and unloading stations.

14. The apparatus according to claim 1, further comprising a cooling station.

15. A method of fixing a tool in a clamping chuck, which comprises:
   providing an apparatus according to claim 1;
   determining an actual position of the tool along an insertion direction;
   inserting the tool into the clamping chuck along the insertion direction, based on the actual position, until a desired position is reached; and
   fixing the tool in the desired position in the clamping chuck.

16. The method according to claim 15, wherein the tool is a shank-type tool.

17. The method according to claim 16, which comprises subsequently unshrinking the tool from the clamping chuck.

18. The method according to claim 15, wherein the insertion direction is defined along a longitudinal axis of the tool.

19. The method according to claim 15, which comprises determining the actual position before and/or during the step of inserting the tool into the clamping chuck.

20. The method according to claim 15, which comprises heating the clamping chuck for receiving the tool and cooling the clamping chuck after the desired position of the tool has been reached for fixing the tool.

21. The method according to claim 15, which comprises determining an actual position of a tool cutting edge of the tool.

22. The method according to claim 15, which comprises determining an actual position of a tool tip of the tool.

23. The method according to claim 15, which comprises defining the desired position with regard to a reference position on the clamping chuck.

24. The method according to claim 23, which comprises determining at least one of the actual position, the desired position, and the reference position in a non-contact manner.

25. The method according to claim 24, Which comprises determining the respective positions with a measuring configuration having an optical system.

26. The method according to claim 25, which comprises repeatedly checking at least one of the actual position, the desired position, and the reference position in a non-contact manner.

27. The method according to claim 15, which comprises rotating at least one of the tool and the clamping chuck about a rotational axis during the step of inserting the tool into the clamping chuck.

28. The method according to claim 27, which comprises rotating the tool and the clamping chuck about a common rotational axis.

29. The method according to claim 15, which comprises holding the tool outside the clamping chuck for the step of determining the actual position and subsequently inserting the tool into the clamping chuck until the desired position is reached.

30. The method according to claim 15, which comprises permanently or temporarily measuring the actual position of the tool during the inserting step along the insertion direction and inserting the tool on a basis of the measured actual position.

* * * * *